April 26, 1949.　　　A. R. VOGEL　　　2,468,314
STEERING SYSTEM
Filed March 17, 1947　　　2 Sheets-Sheet 1
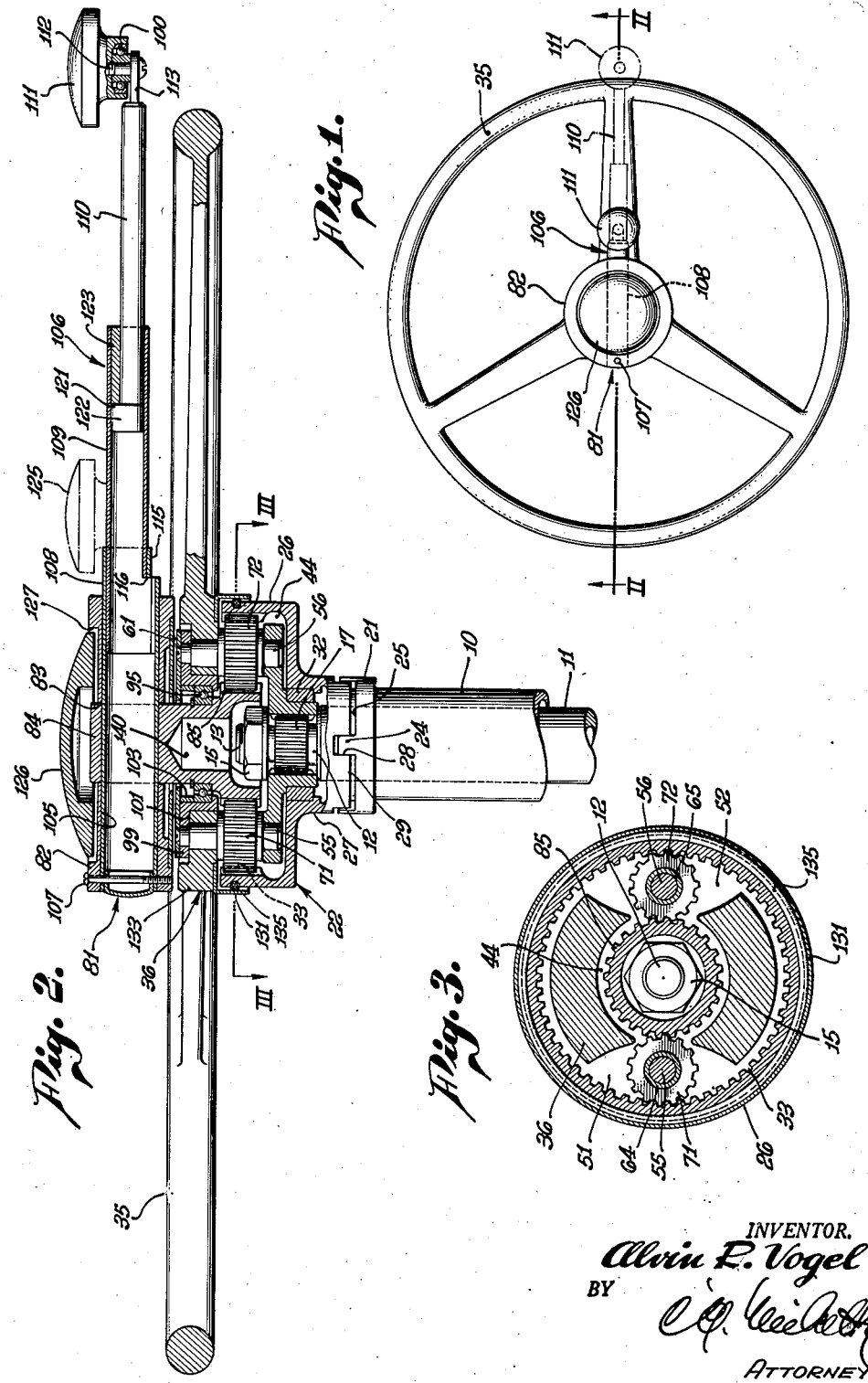
INVENTOR.
Alvin R. Vogel
BY
ATTORNEY.

Patented Apr. 26, 1949

2,468,314

UNITED STATES PATENT OFFICE 2,468,314

STEERING SYSTEM

Alvin R. Vogel, Los Angeles, Calif.

Application March 17, 1947, Serial No. 735,203

13 Claims. (Cl. 74—496)

This invention relates to a steering mechanism and more particularly, but not necessarily to a steering mechanism for heavy vehicles such as trucks and busses.

The conventional steering mechanism provided on certain classes of vehicles, such as trucks and busses, is unsatisfactory under certain conditions of operation, such as turning the wheel of a vehicle when stationary and the guiding of a vehicle when backing in to alleys and up to loading platforms. Under these conditions, much physical effort is required of the operator and renders the operation of such a vehicle laborious and tiresome; also, large vehicles equipped with large tires require much physical effort to steer at low speed and in turning sharp corners.

The conventional steering mechanism provides the proper leverage between the steering wheel and the wheels to be guided under certain conditions of operation, such as when the vehicle is in forward motion, and it is advisable to retain a steering wheel that will provide the usual leverage for which the vehicle was designed. It is also important that the steering mechanism be in fixed operable connection at all times with the steering post of the vehicle in order that it may be available for use when desired by an operator. Therefore, it is a primary object of this invention to provide a dual steering mechanism that may be substituted for the conventional steering wheel of a vehicle which shall provide a steering member that will operate with the same leverage as the conventional steering wheel, together with an auxiliary steering member having a differential connection with the steering wheel or member providing the conventional leverage.

Another object is to provide a steering mechanism which shall provide a pair of steering members permanently connected to the steering post of a vehicle, each steering member providing a different leverage for turning the steering post and adapted for selective operation.

Another object is to provide a pair of steering members permanently connected to the steering post of a vehicle wherein the members are adapted for relative movement with one another and provide different leverages for operating the turning post.

Another object is to provide a dual steering mechanism connected to the steering post of a vehicle and operable independently of one another for providing different leverages for turning the steering post, one of the members having an out-of-the-way position when the other member is in use.

Another object is to provide a dual steering assembly which may be readily and easily substituted for the conventional steering wheel of a vehicle having a pair of independent operable steering elements and a novel differential connection between the steering elements for operably connecting both of said elements with one another and to the steering post of a vehicle.

A further object is to provide a steering system having the above characteristics that shall be attractive in appearance, durable and efficient in operation.

The above and other objects will be made apparent throughout the further description of the invention when taken in connection with the accompanying drawings, wherein like reference characters refer to like parts. It is to be distinctly understood that the drawings are not a definition of the invention but merely illustrate one form by means of which the invention may be effectuated.

In the drawings:

Fig. 1 is a top plan view of a steering mechanism embodying the invention.

Fig. 2 is a sectional view taken along the line II—II of Fig. 1.

Fig. 3 is a sectional view taken along the line III—III of Fig. 2.

Figure 4:
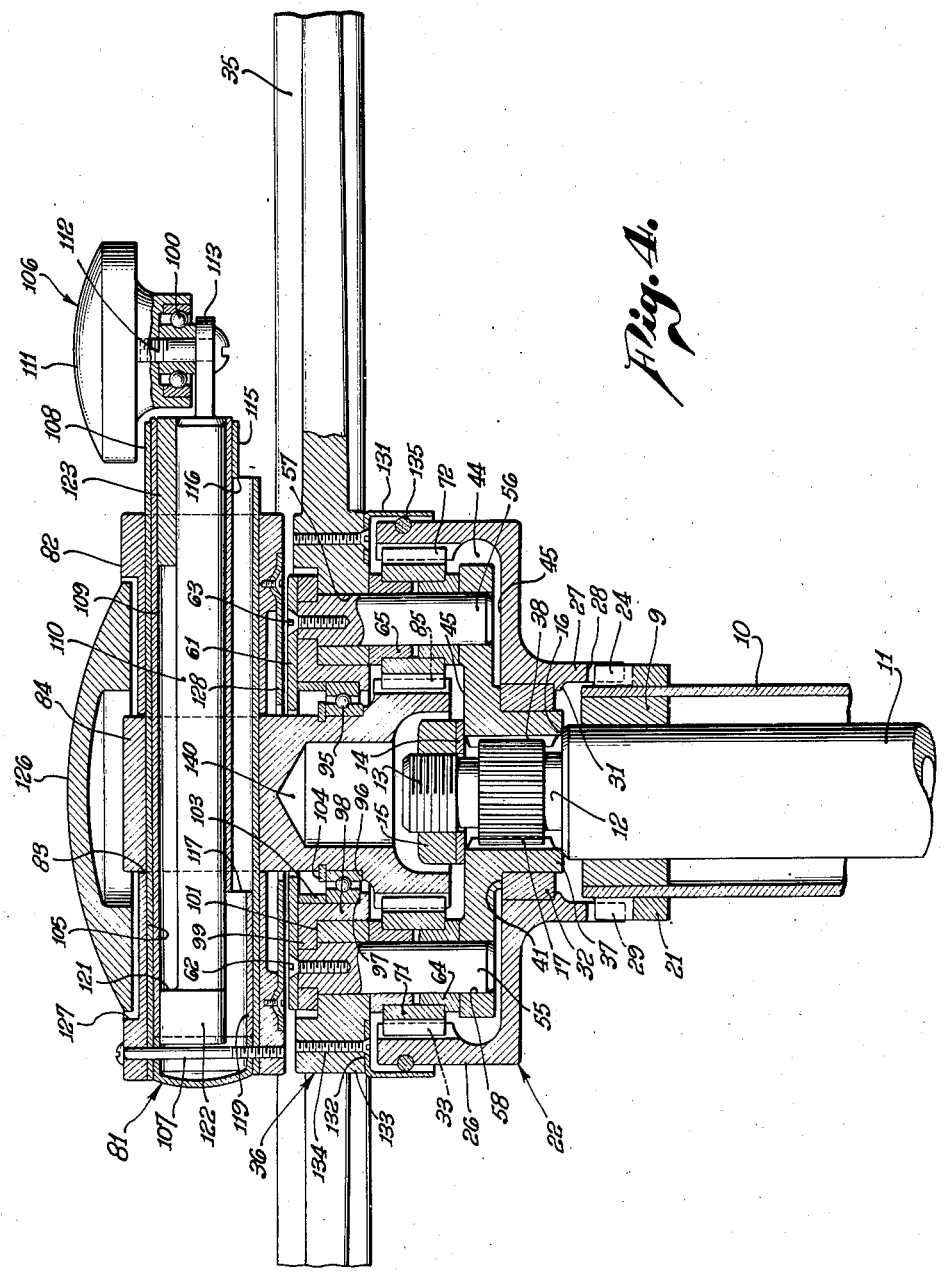
Fig. 4 is an enlarged sectional view similar to Fig. 3 with actuating handle in retracted position.

In the form shown, 10 designates the upper end portion of a stationary tubular housing surrounding a conventional steering post 11. The steering post or shaft 11 is positioned and turnably supported in the housing 10 by suitable bearings, one of which is shown at 9. The upper end of steering post 11 terminates in a reduced portion 12, the end of which is externally threaded, as shown at 13, for receiving a washer 14 and locking nut 15. The reduced portion 12 forms a shoulder 16 on the steering post and intermediate the shoulder 12 and threaded portion 13 there is provided a longitudinally splined portion 17; the purpose of the shoulder 16 and splines 17 will be later described.

The housing 10 and steering post 11, including the reduced portion 12, splines 17, threaded portion 13 and locking nut 15, represent the conventional steering mechanism with the steering wheel removed. In order that the present device may be substituted for the conventional steering wheel, there is provided an extension for the housing 10, and in order that the present device may be detachably mounted on the steering post 11 and housing 10 to permit the remounting and use of the conventional steering wheel, the housing extension is constructed of two parts, a lower part 21 and an upper part, represented in its entirety by 22. The lower part 21 consists of a band or ring member encircling the upper portion of housing 10 and is made integral therewith by any suitable means, such as by welding the band 21 to the housing 10. The upper end of the band 21 has formed thereon a plurality of circumferentially spaced upwardly extending projections 24, these projections defining recesses 25 therebetween.

The upper part of the housing extension 22 consists of an enlarged cylinder-shaped upper portion 26 and a lower reduced tubular-shaped portion 27. The lower reduced portion 27 is of substantially the same diameter as the band 21 and is provided with complementary recesses 28 for receiving the projections 24. The recesses 28 define a complementary downwardly projecting member 29 which fits into the recesses 25 of the band 21, thereby making a rigid connection between the upper and lower parts of the housing extension. An inwardly extending annular projection 31 is provided within the tubular portion 27 upon which is placed a bearing 32, the purpose of which will be later understood. Adjacent the top and inwardly of the open end of the cylindrical-shaped portion 26 an internal gear 33 is provided, the function of which will also become apparent as the description progresses.

A steering wheel 35 is provided with a hub 36, the latter extending into the housing extension 22. The hub is provided with a lower reduced portion 37. The reduced portion 37, which is of tubular shape, is provided internally with longitudinally extending splines 38 adapted to mesh with the splined portion 17 carried by the reduced portion 12 of the steering post 11. The reduced portion 37 of the hub forms an annular shoulder 41 which rests upon the top of the bearing 32 and cooperates with the projection 31 in the reduced portion 27 of the housing extension for positioning the bearing 32 between the housing and the hub portion 37.

The hub is provided with a central opening or bore 44 extending from the top thereof downwardly and connecting with the interior of the tubular portion 37. The bore 44 is larger in diameter than the interior of the tubular portion 37 and forms a shoulder 45. The hub 36 is then clamped in rigid, fixed relation with the steering post 11 by means of the washer 14 and nut 15 so that upon turning the wheel 35, the steering post 11 will be rotated by means of the interconnecting splines 17 and 38. The lower edge of the reduced portion 37 rests on the shoulder 16 of the steering post 11 and prevents further downward movement of the hub and cooperates with the nut 15 for rigidly clamping the hub 36 onto the steering post 11. The assembly of the nut 15 onto the threaded portion 13 of the steering post 11 also positions the shoulder 41 of the hub upon the upper end of the bearing 32 and maintains the latter in assembly relation to the projection 31 on which its lower end rests.

The hub 36 is provided with radially disposed openings 51 and 52 in the opposite sides of the hub 36. These openings connect with the central bore 44 (see Fig. 3). Within the openings 51 and 52 are mounted vertical shafts 55 and 56 respectively. The ends of these shafts 55 and 56 extend into vertical openings 57 and 58 provided in the upper and lower parts of the hub, defining the top and the bottom, respectively, of the recesses 51 and 52 and are anchored therein by means of an annular plate 61 placed on the top of the hub 36 and extending around the bore 44. The plate is connected to the shafts 55 and 56 by suitable means such as screws 62 and 63 respectively. Bearings 64 and 65 are provided on the shafts 55 and 56, respectively, for rotatably supporting planetary pinions 71 and 72 respectively. These pinions 71 and 72 mesh with the internal gear 33 of the housing extension 22 and rotate freely upon their respective shafts 55 and 56.

An auxiliary steering mechanism represented in its entirety by 81 is positioned above the steering wheel 35 and includes a circular-shaped head 82 which is mounted directly above the hub 36 of the wheel 35. The head 82 is provided with a vertical opening 83 for receiving a shaft 84. The shaft 84 extends downwardly below the head 82 and into the central bore 44 of the hub 36 and is provided at its lower end with a sun gear 85. The sun gear 85 meshes with the pinions 71 and 72. The shaft 84 carries a sun gear 85 which is rotatably supported within the hub 36 by means of a bearing 95. The bearing 95 rests upon a shoulder 96 provided on the shaft 84 and a shoulder 97 provided on an annular-spacer member 98. The upper end of spacer member 98 is provided with a horizontally, outwardly extending flange 99 which flange rests upon a shoulder 101 formed within the hub 36 and adjacent the top of the bore 44. The spacer 98 is held in position by the annular plate 61 which rests upon and is held against the upper surface of the flange 99 of the spacer member 98. For the purpose of further anchoring the bearing 95, an annular ring member 103 may be positioned within the spacer member 98, having its lower edge resting on the upper surface of the bearing 95 and its upper edge against the lower surface of the annular plate 61. The bearing 95 may be further anchored by suitable locking ring 104 positioned in a groove provided about the shaft 84 adjacent the top of the bearing 95.

The shaft 84 extends upwardly through the vertically disposed opening in the head 82. For the purpose of rotating the head 82 and the shaft 84, a laterally or horizontally disposed opening 105 is provided through the center of the head 82 and intersects the shaft 84, the latter having an opening therethrough corresponding to the opening 105. A telescopic actuated arm represented in its entirety by 106, having one of its ends inserted in the opening 105 and corresponding opening through the shaft 84, is fixed relative to the head 82 by any suitable means, such as bolt 107.

In the form shown, the actuating handle 106 consists of three telescopic tube-like members 108, 109 and 110. On the outer or free end of the actuating handle 106 a spinner 111 is provided. The spinner 111, which is adapted to be grasped by the hand of an operator, is turnably mounted by means of a bearing 100 carried on a vertical shaft or a bolt 112, the latter being carried by a reduced portion 113 on the outer end of the tube-like member 110. Stop means are provided for limiting the outward movement of the cooperating tube-like members of the actuating arm 106. These stop members may consist of a reduced portion 115 at the outer end of tubular member 108 which forms a shoulder 116 for engaging a shoulder 117, formed by the enlarged inner end 119 of tubular member 109, and a shoulder 121 formed by the enlarged portion 122 on the inner end of tubular member 110, the shoulder 121 being adapted to engage the inner end of a member 123 fixedly mounted within the outer end of tubular member 109. By this telescopic arrangement the spinner may be moved to its retracted out-of-the-way position as shown in the broken lines 125.

A conventional horn button 126 may be mounted in an annular central recess 127 provided in the top of head 82. The horn button 126 may be connected for making contact with electrical contact member 128 carried by the bottom face of head 82. This horn button may be installed on the head member 82 in any convenient or conventional manner.

Sealing means is provided to prevent the egress of lubricant and the ingress of dust and dirt between the upper end of the stationary housing extension and the adjacent relatively movable portion of the wheel hub 36. This sealing means may consist of an annular band 131 encircling the upper end of the housing extension 22. The upper end of band 131 terminates in an inwardly extending flange 132 disposed at right angles to band 131. The band 131, including the flange 132, is carried by the lower face of the adjacent hub portion 133 and fixed thereto by means of screws 134. A packing ring 135 is disposed between the band 131 and the opposing surface of the housing extension 22. The housing extension 22 is provided with a groove circumferentially disposed in the outer surface of housing extension 22 and adjacent the upper end thereof for receiving and maintaining the packing ring 135 in position.

The construction and arrangements of parts of the device lend themselves readily for easy and permanent lubrication. The lubrication may be injected into the recess 140 provided in the lower end of shaft 84 and sun gear 85 and find its way by way of the gear 85 and the pinions 71 and 72 to all the bearings and movable parts of the present device.

In the operation of the device, when it is desired to steer the vehicle and operate the steering post 11 with the conventional leverage provided by the conventional steering wheel for which the vehicle was designed, the telescopic actuating handle 106 may be telescoped into the position as shown at 125, during which time the operator may steer the vehicle with the wheel 35 in the conventional manner inasmuch as the hub 36 of the wheel 35 is directly connected to the steering post 11 by splines 38 and 17, respectively. When it is desired to have additional leverage for turning the steering post 11, as in the case of the vehicle being stationary or backing into alleys or beside loading platforms, the operator extends the actuating arm 106 to the position indicated by the solid lines in Fig. 2, at which time the steering post is rotated by way of the head 82, the shaft 84, which is turnable with and fixed to head 82, sun gear 85, pinions 71 and 72 carried by the vertical shafts 55 and 56 fixedly mounted within the hub 36, the hub 36 being connected to the steering post 11 by splines 17 and 38. As described, when the planetary gears or pinions 71 and 72 are rotated by sun gear 85, the pinions will move along the internal gear 33 and since these pinions are carried by the shafts 55 and 56 mounted within the hub 36, the hub 36 will be rotated accordingly and in turn rotate the steering post 11. Any suitable gear ratio may be provided with the above arrangement by changing the relative sizes of the gear 85, pinions 71 and 72 and the internal stationary gear 33 carried by the housing extension 26.

Accordingly, the above steering mechanism provides a dual steering system, one of which will operate in the conventional manner of the steering mechanism for which the vehicle was designed, and another steering mechanism having a differential connection with the first said steering mechanism whereby an operator is provided greater leverage for turning the steering post than that provided by the conventional steering mechanism. The present dual steering system is compact, durable and may be readily substituted for the conventional steering mechanism by simply removing the conventional steering wheel from the steering post.

While I have illustrated and described one form of the present device, it will now be apparent to those skilled in the art that certain changes, additions, omissions, substitutions and modifications may be made in the structure shown without departing from the spirit and scope of the appended claims.

I claim:

1. In a steering system for a vehicle including a steering post a stationary tubular housing therefor having the conventional steering wheel removed, an extension for said housing having an enlarged cylinder-shaped portion extending radially outwardly therefrom, an internal gear on the inner surface of said portion, a steering member having a hub, said hub extending into said portion and having its lower end removably connected to the upper end of said post for turning the same, a central vertical opening in said hub, openings in the side of said hub connecting with said vertical opening, a vertical shaft having a pinion rotatably mounted thereon in each of said side openings in said hub, said pinions meshing with said internal gear, a gear disposed in said vertical opening and meshing with said pinions in said side openings, said gear having a shaft extending upwardly within said vertical opening and above said hub, and means for turning said shaft.

2. In a steering system in accordance with claim 1 wherein the last said means includes a series of members in telescopic relation arranged to be telescoped into an out-of-the-way position when not in use.

3. A steering system including a steering wheel having a hub, a stationary housing for said hub, an internal gear within and carried by said housing, a vertical opening in said hub, recesses in opposite sides of said hub and connecting with opening, pinions mounted in said recesses, said pinions meshing with said internal gear, a gear mounted in said opening, said gear meshing with said pinions, and means for rotating said gear.

4. A steering system in accordance with claim 3 wherein the last said means includes a series of telescopic members arranged to telescope into an out-of-the-way position.

5. In a steering system, including a steering shaft, a stationary tubular housing therefor having the steering wheel removed, a dual mechanism for replacing said removed steering wheel, said mechanism including a steering wheel having a hub fixed to said shaft, a housing for said hub having an internal gear formed therewithin, said hub housing being fixed to said tubular housing and extending radially outwardly therefrom, said hub having a central vertical opening therethrough and recesses on opposite sides of said hub, said recesses connecting with said opening, pinions mounted in said recesses and meshing with said internal gear, a gear mounted in said opening having a shaft extending upwardly above said hub, the said gear meshing with said pinions, and means for turning said shaft.

6. A steering system for a vehicle including a steering shaft, a stationary housing for said shaft, manual means fixed rigid with said shaft for turning the same, auxiliary means for turning said manual means, both of said means including a hub, a housing for said hub fixed rigidly with the first said housing and extending radially outwardly therefrom, the said auxiliary means including an internal gear within and carried by the said second said housing, and gears carried by and rotatably mounted on said hub, the said gears meshing with the said internal gear, a sun gear meshing with said gears carried by said hub and means for rotating said sun gear.

7. A steering system in accordance with claim 6, wherein the said manual means and said auxiliary means are selectively operated without disturbing the mesh of the gears.

8. A steering system in accordance with claim 6, wherein said sun gear is provided with a shaft extending through a central opening in said hub, and means arranged to be telescoped into an out-of-the-way position when not in use for rotating the last said shaft.

9. A steering system for a vehicle including a steering wheel having a hub, a steering post, a stationary housing for said post, said hub fixedly secured to said steering post for turning the same, a stationary housing for said hub fixed rigid with the first said housing and extending radially outwardly therefrom, and an auxiliary member for turning said post including an internal gear carried by the said second said housing, gears rotatably supported on said hub and meshing with said internal gear, a sun gear meshing with said gears carried by said hub and means for rotating the said sun gear.

10. A steering system in accordance with claim 9, wherein the said sun gear is provided with a shaft, said shaft extending centrally and upwardly through said hub, the upper ends of said shaft having means connected thereto for rotating said sun gear.

11. A removable, selective steering system for vehicles provided with a steering post and a stationary tubular housing for said post, comprising: a hollow hub removably connected to the upper end of the steering post, a steering wheel carried by the hub, a stationary housing for said hub fixed relative to said tubular housing and extending radially outwardly therefrom, a stud shaft carried by the hollow hub axially with respect to the steering post, said stub shaft extending above the plane of the steering wheel, a gear carried by the stub shaft, an internal gear carried by the hub housing, planetary gears carried by the steering wheel and hub and in engagement with the stub shaft gear and internal gear, and separate lever means carried by the upper end of the stub shaft for rotating the latter.

12. A removable, dual steering system for vehicles provided with a steering post and a stationary tubular housing for said post, comprising: a hollow hub removably connected to the upper end of the steering post, a steering wheel carried by the hub, a housing for said hub fixed relative to the tubular housing and extending radially outwardly therefrom, said hollow hub including a vertical opening therethrough, recesses provided in the side of said hub, said recesses connecting with the said vertical opening, pinions rotatably mounted in said recesses, a gear in said vertical opening having a shaft extending upwardly therefrom to a point above said hub, an internal gear carried by said hub housing, the said pinions meshing with said internal gear and said gear in said vertical opening, and means including a collapsible member fixed to the upper end of the last said shaft for turning the same.

13. A removable, duel steering system for vehicles provided with a steering post and a stationary tubular housing for said post, comprising: an enlarged extension for said housing removably fixed thereto, said extension extending radially outwardly from said tubular housing, a hub including a steering wheel fixed to said steering post for directly turning the same, means for rotating said hub, said means including a central vertical opening through said hub, a gear in said opening, recesses in the side of said hub connecting with said vertical opening, gears carried by said hub and rotatably mounted within said recesses, an internal gear carried by said extension, said pinions in said recesses meshing with said internal gear and said gear in said vertical opening, a stub shaft connected axially with said gear in said vertical opening and extending upwardly above said steering wheel, and means for rotating said stub shaft, said means including a head member having a central, vertical opening therein for receiving the upper end of said stub shaft and a transverse opening intersecting the last said vertical opening, a transverse opening in said stub shaft registering with the said transverse opening in said head member and a collapsible lever having its inner end extending through the said transverse openings in said head member and in said stub shaft.

ALVIN R. VOGEL.

REFERENCES CITED

The following references are of record in the file of this patent:

UNITED STATES PATENTS

| Number | Name | Date |
| --- | --- | --- |
| 1,122,500 | Henry | Dec. 29, 1914 |
| 1,348,690 | Barr et al. | Aug. 3, 1920 |
| 1,425,678 | Newhouse | Aug. 15, 1922 |
| 1,672,334 | Monsen | June 5, 1928 |
| 2,169,171 | Torres | Aug. 8, 1939 |
| 2,382,110 | Sheldrick et al. | Aug. 14, 1945 |

FOREIGN PATENTS

| Number | Country | Date |
| --- | --- | --- |
| 243,218 | Great Britain | Nov. 26, 1925 |
| 633,646 | France | Feb. 1, 1928 |
| 642,953 | France | Sept. 7, 1928 |